United States Patent [19]
Hoemann et al.

[11] Patent Number: 5,034,642
[45] Date of Patent: Jul. 23, 1991

[54] PERMANENT MAGNET ROTOR AND MOTOR

[75] Inventors: Keith I. Hoemann, Jefferson County; Scott E. Eckles, St. Louis County, both of Mo.

[73] Assignee: Emerson Electric Co., St. Louis, Mo.

[21] Appl. No.: 575,366

[22] Filed: Aug. 30, 1990

[51] Int. Cl.⁵ .................................. H02K 15/02
[52] U.S. Cl. ............................ 310/156; 310/152; 310/261
[58] Field of Search ............... 310/152, 156, 261, 265, 310/DIG. 3, 257, 154; 322/51, 52, DIG. 5

[56] References Cited

U.S. PATENT DOCUMENTS

| | | | |
|---|---|---|---|
| 4,079,274 | 3/1978 | Richmond | 310/156 |
| 4,130,769 | 12/1978 | Karube | 310/DIG. 3 |
| 4,364,005 | 12/1982 | Kohzai et al. | 310/DIG. 3 |
| 4,625,392 | 12/1986 | Stokes | 310/156 |
| 4,823,038 | 4/1989 | Mizutani et al. | 310/156 |

*Primary Examiner*—William H. Beha, Jr.
*Assistant Examiner*—Matthew Nguyen
*Attorney, Agent, or Firm*—Polster, Polster and Lucchesi

[57] ABSTRACT

A permanent magnet rotor for an electric motor includes longitudinally extending main rotor field and sensor field sections, the sensor field section being substantially shorter than the main rotor field section and being disposed at one end thereof. The sensor field section is magnetized in circumferentially disposed parallel strips of alternating magnetic polarity around the rotor. The main rotor field section has longitudinally extending strips of alternating magnetic polarity which are skewed in a predetermined pattern. The predetermined pattern includes a first portion in which each longitudinally extending strip runs generally at a first predetermined non-zero angle with respect to the longitudinal axis of the rotor, a second portion in which each longitudinally extending strip runs generally at a second predetermined non-zero angle with respect that axis, and a third portion in which each longitudinally extending strip runs generally at the first predetermined non-zero angle with respect to the axis. The first and second angles are opposite in sign.

20 Claims, 2 Drawing Sheets

PERMANENT MAGNET ROTOR AND MOTOR

BACKGROUND OF THE INVENTION

This invention relates to permanent magnet motors and more particularly to such motors which minimize cogging and simplify rotor position sensing.

Electric motors with permanent magnet rotors suffer from a condition called "cogging." Cogging is a variation in motor torque caused by variations in magnetic flux due to alignment of the rotor and the stator teeth at various positions of the rotor. This effect can reduce the efficiency and reliability of the motor.

Various methods have been tried in the past to overcome the cogging problem. Among these are skewing the magnets on the rotor in either a straight or herringbone pattern. Skewing the magnets in these ways, however, creates additional difficulties. The rotational position of the rotor is typically sensed by a separate sensor such as a Hall effect sensor. To reduce the complexity of the control system for the motor, it is desirable that the sensor be disposed in a particular location with respect to the stator. This position, however, it not necessarily the best when the skewing of the rotor magnets is considered.

SUMMARY OF THE INVENTION

Among the various objects and features of the present invention may be noted the provision of an improved rotor and motor which minimizes cogging.

Another object is the provision of such a rotor and motor which is relatively simple in construction.

A third object is the provision of such a rotor and motor which allows any skew to be used with a common sensor.

A fourth object is the provision of such a rotor and motor which maintains optimum sensor position for maximum motor performance.

A fifth object is the provision of such a rotor and motor which provides effective skew and maintains optimum sensor position relative to the rotor field without requiring physical adjustment of the sensor.

A sixth object is the provision of such a rotor and motor which has equivalent operation to that of rotors with standard skews yet which allows the sensor field to be located anywhere in the skew angle.

Other objects and features will be in part apparent and in part pointed out hereinafter.

Briefly, a permanent magnet rotor of the present invention includes a main rotor field section and a sensor field section, each extending longitudinally along the rotor. The sensor field section is substantially shorter than the main rotor field section and is disposed at one end of said main rotor field section. The sensor field section is magnetized in circumferentially disposed parallel strips of alternating magnetic polarity which extend around the rotor. The main rotor field section has longitudinally extending strips of alternating magnetic polarity which are skewed in a predetermined pattern, all of said longitudinally extending strips being skewed in the same predetermined pattern. The predetermined pattern includes a first portion in which each longitudinally extending strip runs generally at a first predetermined non-zero angle with respect to the longitudinal axis of the rotor, a second portion in which each longitudinally extending strip runs generally at a second predetermined non-zero angle with respect to the longitudinal axis of the rotor, and a third portion in which each longitudinally extending strip runs generally at the first predetermined non-zero angle with respect to the longitudinal axis of the rotor. The first and second predetermined non-zero angles are of opposite sign.

BRIEF DESCRIPTION OF THE DRAWINGS

Similar reference characters indicate similar parts throughout the various views of the drawings.

DESCRIPTION OF THE PREFERRED EMBODIMENT

Figure 1:
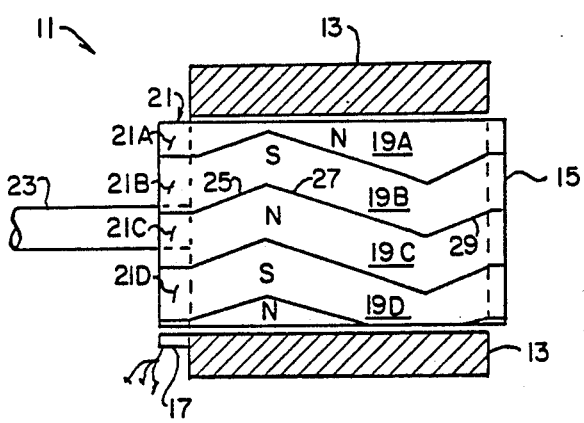
FIG. 1 is a perspective view, with parts removed for clarity, of a permanent magnet rotor and motor of the present invention.
Figure 1A:
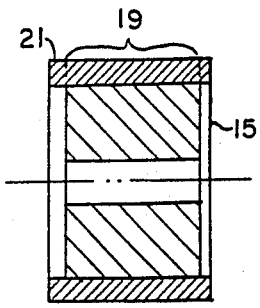
FIG. 1A is a cross-sectional view on a different scale of the rotor of FIG. 1.

Turning to the drawings, and particularly to FIGS. 1 and 1A, there is shown a permanent magnet motor 11 of the present invention. Motor 11 includes a stator 13 having a central bore in which a permanent magnet rotor 15 is mounted for rotation. A Hall effect sensor 17 is disposed adjacent one end of the rotor to sense the relative rotational position of rotor 15. The stator and Hall effect sensor are conventional.

Rotor 15, however, is not conventional. It is divided into two parts: a main rotor field section 19 and a sensor field section 21, both of which extend longitudinally along the rotor. Sensor field section 21 is substantially shorter than the main rotor field section and is disposed at one end of main rotor field section 19. A motor shaft 23, secured to rotor 15, is also shown in FIG. 1.

The sensor field section is magnetized in circumferentially disposed parallel strips of alternating magnetic polarity including strips 21A, 21B, 21C and 21D, which strips are generally parallel to the longitudinal axis of the rotor. It should be appreciated that the boundaries between adjacent strips of the sensor field section are detected by the Hall effect sensor so that the rotational position of rotor 15 can be determined.

Main rotor field section 19 also has longitudinally extending strips of alternating magnetic polarity, labelled 19A, 19B, 19C, and 19D. The main field section longitudinally extending strips, as can be seen from FIG. 1, are integral with the sensor field section strips. Each main field section strip is skewed in a predetermined pattern in which a first portion 25 runs generally at a first predetermined non-zero angle with respect to the longitudinal axis of the rotor, a second portion 27 runs generally at a second predetermined non-zero angle with respect to the longitudinal axis of the rotor, and a third portion 29 runs generally at the first predetermined non-zero angle with respect to the longitudinal axis of the rotor. The first and second predetermined non-zero angles are of opposite sign and generally equal in magnitude.

Figure 2:
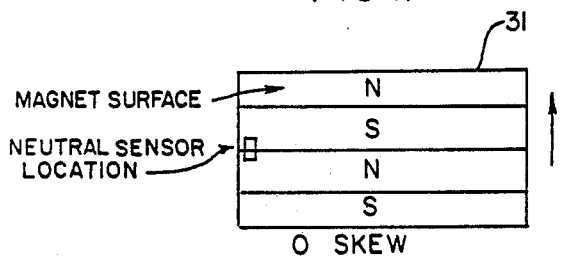
FIG. 2 is a simplified elevation of a prior art rotor with no skew.

This particular skewing arrangement has several advantages over conventional skewing patterns and over an unskewed rotor. The unskewed rotor, labelled 31, (FIG. 2) for example has the advantage that the neutral locations for the rotor correspond to the boundaries between adjacent strips of magnetization. This design is subject to cogging, however. It is also not a simple matter to incorporate leading or lagging switching if that is desired.

The straight skew rotor, labelled 33 (FIG. 3), solves the cogging problem, but at the expense of having the neutral location no longer correspond to the location at which the sensor detects a boundary. The system shown in FIG. 3 inherently has a lagging response, given the direction of rotation indicated by the arrow. If this amount of lag is not that desired, however, it can be fairly complicated to provide the required lag (or lead).

The herringbone skew rotor, labelled 35 (FIG. 4), has the same advantages and disadvantages discussed above in connection with the straight skew rotor.

Figure 3:
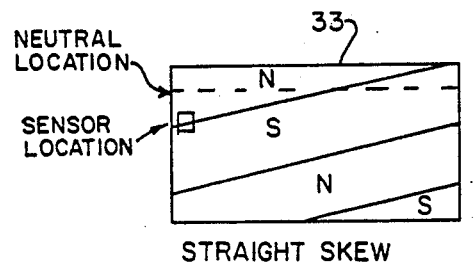
FIG. 3 is a simplified elevation of a prior art rotor with straight skew.
Figure 4:
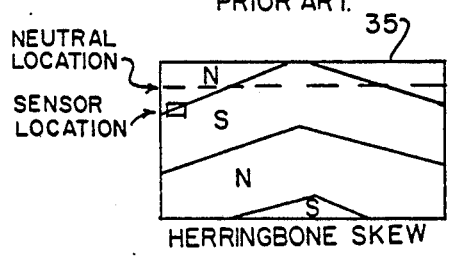
FIG. 4 is a simplified elevation of a prior art rotor with herringbone skew.
Figure 5:
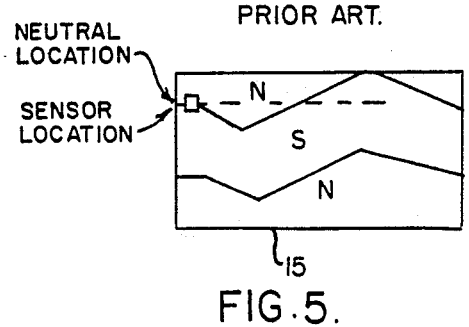
FIG. 5 is a simplified elevation of a rotor of the present invention with the sensor at the neutral location.

Rotor 15 (FIG. 5) of the present invention solves the cogging problem, and the difficulties associated with the rotors of FIGS. 3 and 4. Because of the unique structure of the rotor skewing, the neutral locations of the rotor fall precisely on the boundaries between the sensor field section strips. As a result, no compensation for sensor position is required.

Figure 6:
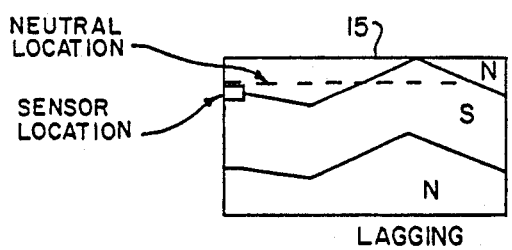
FIG. 6 is a simplified elevation of a rotor of the present invention with the sensor lagging the neutral location.
Figure 7:
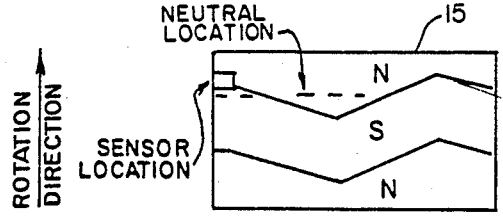
FIG. 7 is a simplified elevation of a rotor of the present invention with the sensor leading the neutral location.

This particular structure also permits lead or lag to be incorporated into the rotor, without any change in sensor position or other compensation. For example, FIG. 6 shows how the skew pattern of the present invention can be changed to provide for lag, while FIG. 7 illustrates the same thing for lead.

Figure 8:
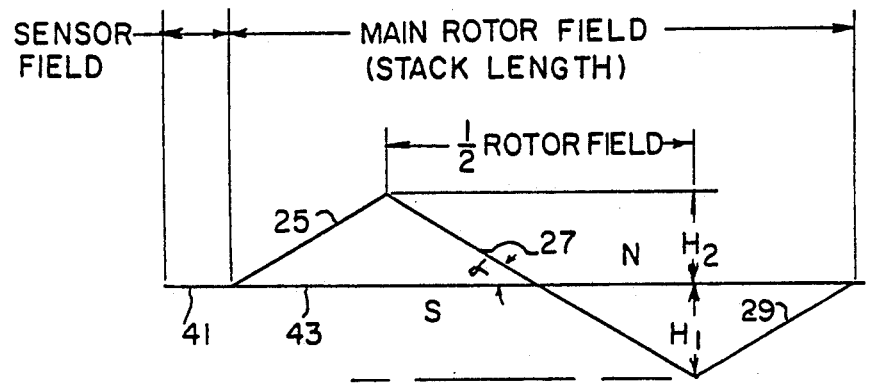
FIG. 8 is a graphical representation of the skew of the rotor of the present invention showing a neutral sensor position.
Figure 9:
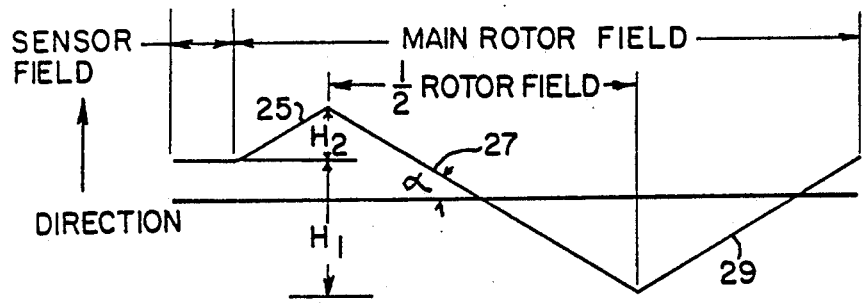
FIG. 9 is a graphical representation of the skew of the rotor of the present invention showing a leading/lagging sensor position.

The aspects of the present invention which provide this versatility are illustrated in more detail in FIGS. 8 and 9. FIG. 8 illustrates the boundary between adjacent strips for a rotor without lead or lag. In this embodiment the boundary between sensor field strips, labelled 41, lies on the neutral location 43. As can be seen from FIG. 8, the neutral location is a line along which the average magnetization, measured over the main rotor field length, is zero.

For zero lead or lag, the maximum circumferential distances between the sensor field boundary 41 and the main rotor field boundary, labelled H1 and H2, are equal. Since the main rotor field boundary is symmetric with respect to the neutral location, this requirement is assured by having the sensor field boundary 41 line along the neutral location 43.

Turning to FIG. 9, lead or lag is easily incorporated into rotor 15 by simply moving the position of the sensor field boundary as desired and shifting the curve representing the main rotor field boundary in the direction shown to match the new position of the sensor field boundary. For example, assuming rotation in the direction indicated by the arrow in FIG. 9, rotor 15 would have a leading response. The curve of FIG. 8 is shifted to the left to correspond to this new sensor field boundary position. Note that this shifting leaves the neutral location and boundary portion 27 unchanged. It simply takes part of portion 25 and adds it to the end of portion 29.

In this way, the boundary between the two strips of the sensor field section corresponding to a predetermined pair of longitudinally extending strips of the main rotor field section is circumferentially offset from the neutral line associated with said predetermined pair of longitudinally extending strips to provide the desired lead or lag. As a result any desired lead or lag is easily incorporated into the rotor without requiring any change in the position of the sensing device itself.

Several of the geometrical relationships between the various parts of the skew pattern of the present invention can be easily seen from FIGS. 8 and 9. Second portion 27 is always disposed between first portion 25 and third portion 29 with the second portion starting at one end of the first portion and ending at one end of the third portion.

Second portion 27 constitutes half the main rotor field length, while portions 25 and 29 make up the other half. Thus, second portion 27 is longer than either of the first and third portions and is substantially equal to their sum. Moreover, the circumferential extent of second portion 27, which is H1 plus H2, generally equals the skew angle of the rotor.

Figure 10:
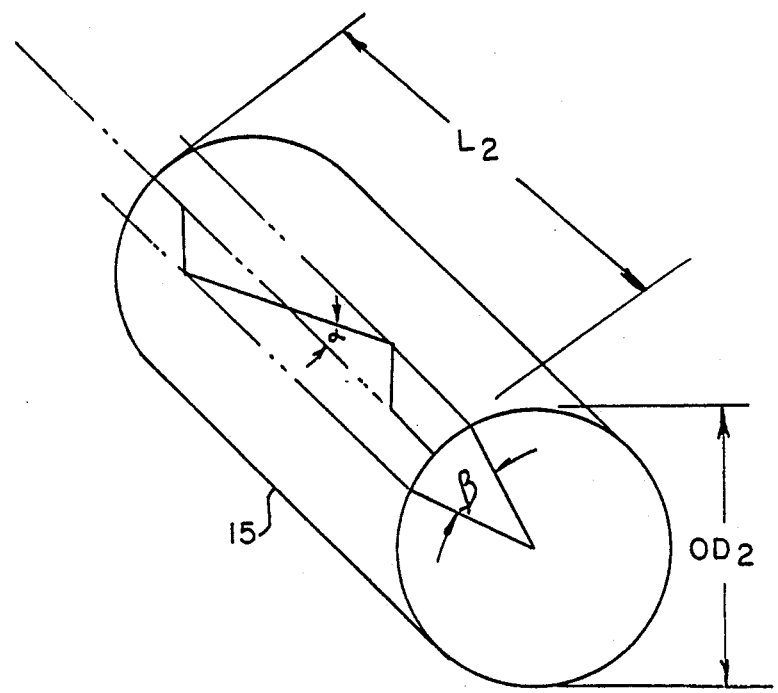
FIG. 10 is a simplified elevation illustrating the angles involved in the rotor of FIG. 1.

Calculation of the skew dimensions of rotor 15 is as follows (see FIG. 10):

1) Determine the desired sector skew angle (labelled by the Greek letter "beta" on FIG. 10. One slot pitch is required to reduce cogging. Therefore, by way of example, if the stator has 36 slots, the sector skew angle beta equals 360 degrees divided by the number of slots, so that the sector skew angle is 10 degrees.

2) Determine the skew angle (labelled by the Greek letter "alpha" on FIG. 10. The skew angle alpha equals the inverse tangent of $(OD_2 * PI * BETA)/(180 * L_2)$, where $OD_2$ is the diameter of rotor 15, BETA is the sector skew angle (in degrees) determined in step 1, and $L_2$ is the length of main rotor field 19.

3) For the sensor field at neutral position, $H_1$ equals $H_2$ (see FIG. 8), and each equals $(OD_2 * PI * BETA)/720$.

4) For a lead or lag, the following inequalities hold: $H_1$ greater than $H_2$ for lead, and $H_2$ greater than $H_1$ for lag. For a given shift ED in electrical degrees, the offset is $(2 * PI * OD_2 * ED)/P * 360$, where P equals the number of poles. $H_1$ and $H_2$ are calculated from the offset as follows:

| Lead | $H_1 = ((OD_2 * BETA) / 4) + $ Offset |
|  | $H_2 = ((OD_2 * BETA) / 4) - $ Offset |
| Lag | $H_1 = ((OD_2 * BETA) / 4) - $ Offset |
|  | $H_2 = ((OD_2 * BETA) / 4) + $ Offset, | where BETA is in radians.

In view of the above it will be seen that the various objects and features of the invention are achieved and other advantageous results obtained. As various changes could be made in the above constructions without departing from the scope of the invention, it is intended that all matter contained in the description or shown in the drawings shall be illustrative only.

What is claimed is:

1. A permanent magnet rotor for a dynamoelectric machine comprising:

a main rotor field section and a sensor field section, each extending longitudinally along the rotor, said sensor field section being substantially shorter than the main rotor field section and being disposed at one end of said main rotor field section;

the sensor field section being magnetized in circumferentially disposed parallel strips of alternating magnetic polarity;

the main rotor field section having longitudinally extending strips of alternating magnetic polarity, said longitudinally extending strips being skewed in a predetermined pattern, all of said longitudinally extending strips being skewed in the same predetermined pattern, said predetermined pattern including a first portion in which each longitudinally extending strip runs generally at a first predetermined non-zero angle with respect to the longitudinal axis of the rotor, a second portion in which each longitudinally extending strip runs generally at a second predetermined non-zero angle with respect to the longitudinal axis of the rotor, said first and second predetermined non-zero angles being of opposite sign, and a third portion in which each longitudinally extending strip runs generally at the first predetermined non-zero angle with respect to the longitudinal axis of the rotor.

2. The rotor as set forth in claim 1 wherein the second portion is disposed between the first and third portions, said second portion starting at one end of the first portion and ending at one end of the third portion.

3. The rotor as set forth in claim 1 wherein the second portion is longer than either of the first and third portions.

4. The rotor as set forth in claim 3 wherein the length of the second portion is substantially equal to the sum of the lengths of the first and third portions.

5. The rotor as set forth in claim 1 wherein each pair of said longitudinally extending strips of alternating magnetic polarity have a neutral line associated therewith, said neutral line having an average magnetization obtained by averaging the magnetization along said line, said neutral line being parallel to the longitudinal axis of the rotor and being disposed such that the average magnetization along the neutral line is zero.

6. The rotor as set forth in claim 5 wherein a boundary between adjacent strips of the sensor field section lies along one of the neutral lines.

7. The rotor as set forth in claim 5 wherein each strip of the sensor field section is associated with a longitudinally extending strip of the main rotor field section and wherein the boundary between the two strips of the sensor field section corresponding to a predetermined pair of longitudinally extending strips of the main rotor field section is circumferentially offset from the neutral line associated with said predetermined pair of longitudinally extending strips.

8. The rotor as set forth in claim 1 wherein the second portion of each longitudinally extending strip extends circumferentially at least part of the way around the rotor so as to have a circumferential extent, wherein the rotor has a skew angle, and wherein the circumferential extent of the second portion of each longitudinally extending strip generally equals the skew angle of the rotor.

9. The rotor as set forth in claim 1 wherein each strip of the sensor field section is associated with a longitudinally extending strip of the main rotor field section and each strip of the sensor field section is generally parallel to the longitudinal axis of the rotor.

10. The rotor as set forth in claim 1 wherein the first and second predetermined angles are substantially equal in magnitude.

11. The rotor as set forth in claim 1 wherein the length of the second portion of each longitudinally extending strip is approximately one-half the length of the main rotor field section.

12. A brushless permanent magnet motor comprising:
a rotor;
a stator having a central bore in which the rotor is disposed for rotation; and
Hall effect sensing means for sensing the rotational position of the rotor, said Hall effect sensing means being fixed with respect to the stator at one end of the rotor so that the rotor rotates beneath the Hall effect sensing means;
said rotor including a main rotor field section and a sensor field section, each extending longitudinally along the rotor, said sensor field section being substantially shorter than the main rotor field section and being disposed at one end of said main rotor field section adjacent the Hall effect sensing means;
the sensor field section of the rotor being magnetized in circumferentially disposed parallel strips of alternating magnetic polarity;
the main rotor field section of the rotor having longitudinally extending strips of alternating magnetic polarity, said longitudinally extending strips being skewed in a predetermined pattern, all of said longitudinally extending strips being skewed in the same predetermined pattern, said predetermined pattern including a first portion in which each longitudinally extending strip runs generally at a first predetermined non-zero angle with respect to the longitudinal axis of the rotor, a second portion in which each longitudinally extending strip runs generally at a second predetermined non-zero angle with respect to the longitudinal axis of the rotor, said first and second predetermined non-zero angles being of opposite sign, and a third portion in which each longitudinally extending strip runs generally at the first predetermined non-zero angle with respect to the longitudinal axis of the rotor.

13. The brushless permanent magnet motor as set forth in claim 12 wherein the second portion of each longitudinally extending rotor strip is disposed between the first and third portions of said longitudinally extending rotor strip, said second portion starting at one end of the first portion and ending at one end of the third portion.

14. The brushless permanent magnet motor as set forth in claim 12 wherein the second portion of each longitudinally extending rotor strip is longer than either of the first and third portions.

15. The brushless permanent magnet motor as set forth in claim 14 wherein the length of the second portion is substantially equal to the sum of the lengths of the first and third portions.

16. The brushless permanent magnet motor as set forth in claim 12 wherein each pair of said longitudinally extending strips of alternating magnetic polarity have a neutral line associated therewith, said neutral line being parallel to the longitudinal axis of the rotor and being disposed such that the average magnetization along the neutral line is zero.

17. The brushless permanent magnet motor as set forth in claim 16 wherein a boundary between adjacent strips of the sensor field section lies along one of the neutral lines.

18. The brushless permanent magnet motor as set forth in claim 16 wherein each strip of the sensor field section is associated with a longitudinally extending strip of the main rotor field section and wherein the boundary between the two strips of the sensor field section corresponding to a predetermined pair of longitudinally extending strips of the main rotor field section is circumferentially offset from the neutral line associated with said predetermined pair of longitudinally extending strips.

19. The brushless permanent magnet motor as set forth in claim 12 wherein each strip of the sensor field section is associated with a longitudinally extending strip of the main rotor field section and each strip of the sensor field section is generally parallel to the longitudinal axis of the rotor.

20. The brushless permanent magnet motor as set forth in claim 12 wherein the first and second predetermined angles are substantially equal in magnitude.

* * * * *